Feb. 17, 1925.
L. STEARNS
WHEEL ATTACHING DEVICE
Filed March 7, 1923
1,526,612
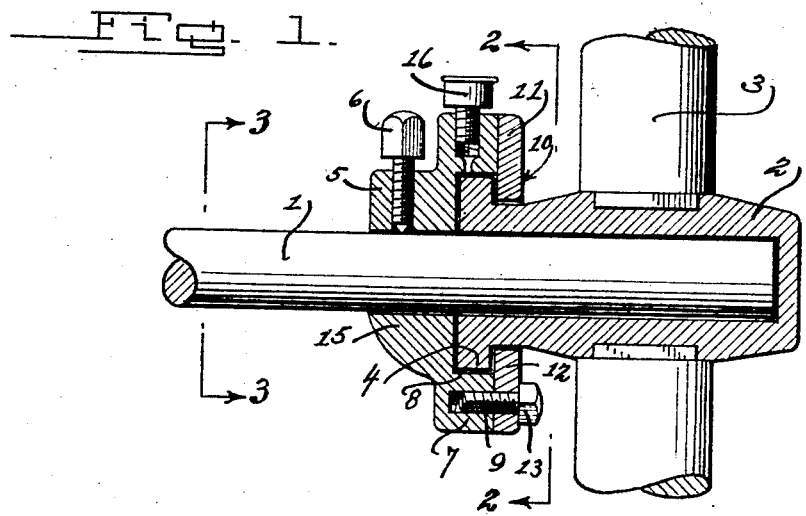
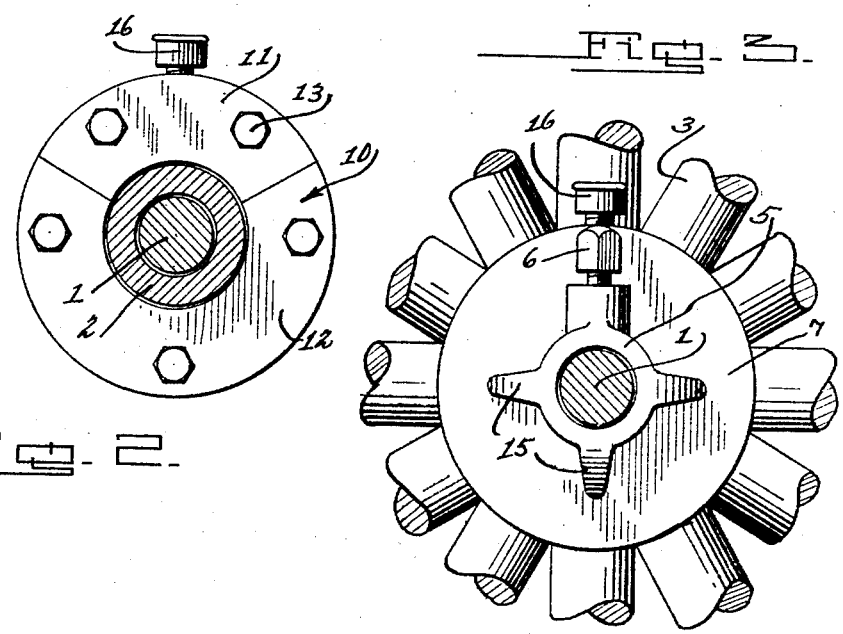
Inventor
Lester Stearns
By *William J. Gerlie*
Attorney Patented Feb. 17, 1925.

1,526,612

UNITED STATES PATENT OFFICE.

LESTER STEARNS, OF HECLA, SOUTH DAKOTA.

WHEEL-ATTACHING DEVICE.

Application filed March 7, 1923. Serial No. 623,412.

*To all whom it may concern:*

Be it known that LESTER STEARNS, a citizen of the United States, residing at Hecla, in the county of Brown and State of South Dakota, has invented certain new and useful Improvements in Wheel-Attaching Devices, of which the following is a specification.

This invention relates to a wheel attaching device and has for its principal object to provide a simple and efficient means whereby a wheel may be supported upon the axle of a vehicle and is especially adapted for use upon wheels of cultivators or the like.

Another important object of the invention is to provide a wheel attaching device of the above mentioned character which is of such a construction as to enable the same to be easily and quickly taken off of the axle for necessary repairs and does not require the employment of a number of complicated tools in order to accomplish this result.

A still further object of the invention is to provide a wheel attaching device of the above mentioned character, with means for retaining the wheel in position on the axle and furthermore provided with a lubricating means for lubricating the wearing surfaces of the various parts.

A still further object of the invention is to provide a wheel mounting of the above mentioned character, which is simple in construction, inexpensive, strong, durable and further well adapted for the purpose for which it is designated.

Other objects and advantages of this invention will become apparent during the course of the following description.

In the accompanying drawings forming a part of this specification and in which like numerals designate like parts throughout the same.

Figure 1 is a central longitudinal section through my improved wheel mounting and showing the same in position upon the axle and in engagement with the hub of the wheel.

Figure 2 is a sectional view taken on line 2—2 of Fig. 1 of the drawings and looking in the direction of the arrows.

Figure 3 is a sectional view taken on line 3—3 of Fig. 1 and looking in the direction of the arrows.

In the drawings wherein for the purpose of illustration is shown the preferred embodiment of my invention, the numeral 1 designates the axle and upon which is supported the hub 2 of the wheel 3. The hub 2 has its outer end disposed to fit over the end of the axle 1 and the inner end of the hub 2 is provided with an annular outstanding flange 4.

Detachably mounted upon the axle 1 and adapted to be associated with the annular flanged end 4 of the hub 2 is my wheel attaching device which comprises a sleeve or casing 5 and this casing 5 is held upon the axle 1 in a locked position by means of the locking screw 6. The inner end of the locking screw 6 being adapted to engage the axle 1 whereby the casing is supported upon the axle in fixed position. The sleeve or casing 5 is provided at its outer end with an annular flange 7. This annular flange 7 forms a pocket or housing 8 which is adapted to receive the annular outstanding flange 4 of the hub 2.

The outer face of the annular flange 7 is provided with suitable threaded spaced apertures 9 and the purpose of these threaded apertures 9 will hereinafter be more fully described.

The annular flange 7 provided at the outer end of the casing 5 is adapted to extend over the periphery of the annular flange 4 which is provided at the inner end of the hub 2 and for the purpose of retaining the sleeve 5 and the hub 2 and the wheel 3 carried thereby in position on the axle 1 I provide a retaining ring 10. This retaining ring is constructed to provide the segments 11 and 12 whereby the retaining ring may be taken apart for the purpose to be more fully described.

The retaining ring 10 which comprises the annular segments 11 and 12 is secured to the outer face of the annular flange 7 by means of the threaded bolts 13 which pass through the openings provided in the segments 11 and 12 of the retaining ring and which are so arranged in the segments to register with the threaded apertures 9 provided in the annular flange 7 when the retaining ring 10 is placed in position thereon. The threaded bolts 13 will hold the retaining ring 10 in position on the annular flange 7 of the casing 5, and this retaining ring 10 is adapted to extend inwardly of the annular flange 7 so as to provide means for engagement with the outer face of the annular flange 4 formed upon the hub 2 whereby the accidental displacement of the hub 2 and the wheel 3 carried thereby will be prevented.

The sleeve or casing 5 is provided with a series of spaced reinforcing ribs 15 as more clearly shown is Fig. 3 of the drawings and the purpose of these reinforcing ribs 15 is to provide the rear face of the annular flange 7 with suitable reinforcements.

For the purpose of lubricating the various parts of the casing 5 and the flanged end 4 of the hub 2 where considerable wear takes place, I provide a suitable lubricating device as illustrated at 16 in the drawings and this lubricator is mounted in the annular flange 7 on the sleeve or casing 5 so as to permit the lubricant contained in the lubricator 16 to be discharged around the places where the wear takes place and thereby provide enough lubrication to accomplish the necessary results and provide for the proper operation of the hub 2 within the casing 5.

By providing a retaining ring 10 of a segmental construction it will be seen that it is not necessary to remove the entire ring in order to obtain access to the several parts of the casing and furthermore the casing is so constructed and associated upon the axle as to enable the same to be easily and quickly removed therefrom or adjusted thereon into the proper position. The simplicity of my device renders the same very efficient and useful in its application to various uses such as upon cultivators of the wheel type and other machinery or vehicles.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit or sacrificing any of the principles of the invention.

What I claim as new and desire to secure by Letters Patent is:—

A vehicle wheel attaching device comprising a shaft, a hub mounted thereon and provided with a laterally disposed annular flange, a casting provided with a transverse opening through which the shaft extends, a set screw carried by the casting and engaged with the shaft, an annular housing formed with the casting and snugly accommodating the annular flange therein, a plurality of reinforcing ribs formed with the housing and casting, and an annular sectional ring detachably secured to the inner face of the housing and extending into close proximity to the hub and overlying the annular flange thereof.

In testimony whereof I affix my signature.

LESTER STEARNS.